J. Hollingsworth.

Smut Mill.

No. 281. Reissued Oct. 10, 1854.

UNITED STATES PATENT OFFICE.

JEHU HOLLINGSWORTH, OF ZANESVILLE, OHIO.

IMPROVEMENT IN SMUT-MACHINES.

Specification forming part of Letters Patent No. 8,061, dated April 22, 1851; Reissue No. 281, dated October 10, 1854.

*To all whom it may concern:*

Be it known that I, JEHU HOLLINGSWORTH, of Zanesville, in the county of Muskingum and State of Ohio, have invented certain new and useful Improvements in Smut-Machines; and I do hereby declare the following to be a full, clear, and exact description of the same, reference being had to the accompanying drawings, making a part thereof, in which—

Figure 3:
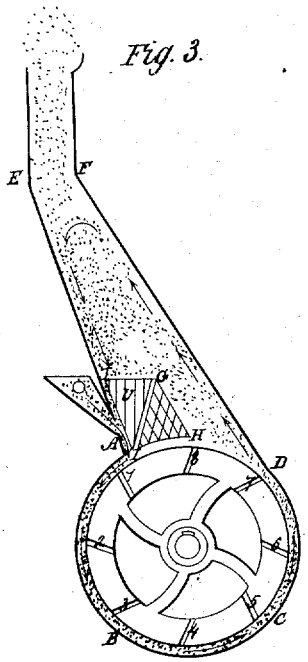
Figure 4:
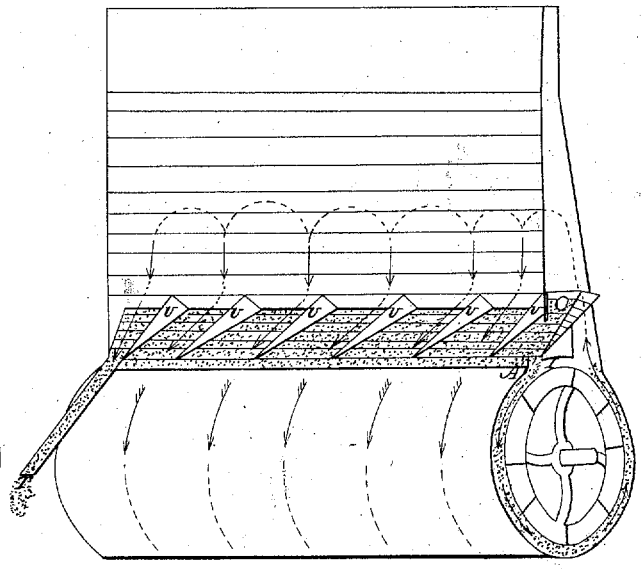
Figure 1:
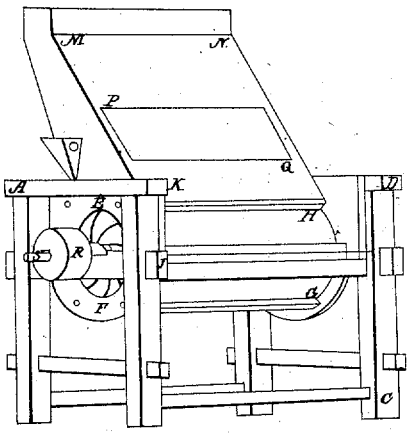
Figure 2:
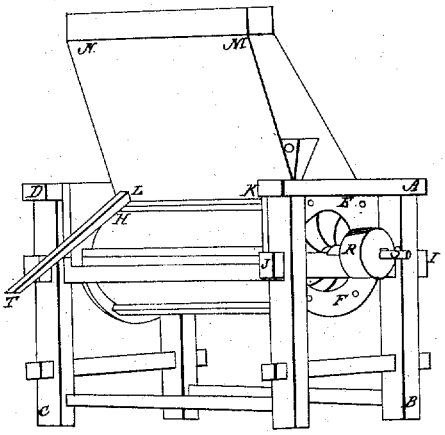

Figure 1 represents a front perspective view. Fig. 2 represents a rear perspective view. Fig. 3 represents a vertical section taken through the chimney, concave, and beater, and showing the inclined aprons, feeding-hopper, &c.; and Fig. 4 represents a rear view of the chimney, giving in detail the operation of the aprons that conduct the wheat from its receiving to its discharging point.

Similar letters refer to like parts.

The nature of my invention consists in scouring and freeing wheat of smut and other impurities by throwing up the grain at every revolution of the beater, and out of the concave, against the side or face of an inclined or curved chimney, through an opening at or near the top of the concave, and returning the grain back into the concave to be worked over and over again, while the impurities are driven out of the chimney by the blast or current through the machine; also, in combination with the cylinder and chimney, the inclined aprons for transferring the grain from end to end of the cylinder that it may be discharged therefrom when thorougly cleaned.

To enable others skilled in the art to make and use my invention, I will proceed to describe the same in connection with the drawings.

The frame A B C D, in which the machine is adjusted, may be made in any well-known substantial manner, and thereon is placed a horizontal hollow cylinder, E F G H, which may be made of wood or iron or parts of both. The inside surface of said cylinder may be coated with emery, which forms a durable and sharp scouring-surface. Both ends of said cylinder should have openings in them around the shaft, and over these openings should be placed wire-gauze, or any other protection, to keep the grains from bounding out of the cylinder, while the air which is to form the current for carrying up and out of the machine the impurities scoured from the grain may freely pass into the cylinder. A large opening is made in said cylinder at or near the top, which extends along the whole length of the cylinder, or from K to L, Figs. 1, 2, and is several inches in width so that at each revolution of the beaters everything in the cylinder, or nearly so, may be thrown or driven out through said opening, the grain falling back into the cylinder after its momentum is lost, and the impurities, which are lighter, being carried out of the end chimney, as will be more particulary described hereinafter. Closely fitting this opening in the concave is a chimney, M K L N, ascending in an inclined or curved position, and extending to any desired point. Said chimney is wider at the bottom than at the top, for concentrating and keeping up the blast through it with uniformity, and the opening through the concave into the cylinder, at whatever point it may be, should be tangential, or nearly so, with the interior perimeter of the concave, so that the centrifugal force upon the grain may cause it to pass out freely through said opening, and then impinge upon the inclined or curved face or side of the chimney until the force is expended, when it will drop back again into the cylinder, the lighter impurities passing on and out of the top of the machine or chimney. Through this concave or hollow cylinder passes a shaft, S, which revolves in suitable bearings or boxes at each end of the frame, and on this shaft inside of the heads of the cylinder at each end is secured circular flanges by means of straight or curved radial arms extending from a hub on said shaft to said flanges, these arms leaving an open space all around said shaft. They are seen in Figs. 1, 2 at the open ends of the cylinder. There may be any suitable number of beaters, 1 2 3 4 5 6 7 8, Fig. 3, extending from the flange at one end to the flange at the other end. The beaters may be from three to four inches in width, and their outer edges when in motion may approach within one inch (more or less) of the inner perimeter of the cylinder. The width given to the beaters is for the purpose of creating a blast, and their number for scouring purposes. A glass plate, P Q, Fig. 1, may be placed in the front of the chimney, so that the operation of the machine may be inspected at all times. A pulley, R, is fastened to the shaft S, over which may pass a band from any first mover to give motion to the machine. O is a hopper that conducts the wheat into the machine, and L T, Fig. 2, a spout through which it is discharged out of the machine after it is cleaned.

In Fig. 3, A B C D is an end view of the cylinder, representing it as open at or near the top from A to D, and A E F D is an end view of the chimney fitted to the opening. A solid division or partition, H I G, is arranged in the chimney, extending from one side to the other, and is of a triangular form, the base H I having the curve of the cylinder, and the side H G running parallel, or nearly so, to the side D F of the chimney. The line D F is obtained by drawing from the point D a line at right angles to the face of the beaters. The third side, G I, extends from a point about one inch distant from A, where the opening in the concave commences, to the point G, so that this partition H I G in the chimney fills up nearly one-half of the opening. A hopper, O, conducts the wheat into the cylinder through the small open space existing between A, the point at which the concave ends, and the point I, at which the partition in the chimney begins. From point G draw a horizontal line, G J, to the back of the chimney, then J I G will represent an area the whole width of the chimney, the top of said area being some six or eight times larger than the bottom of it.

Suppose the wheat entered in the hopper O. Now, by following the direction of the arrows, it will be seen by the action of the beaters 1 2 3 4 5 6 7 8, Fig. 3, that the wheat is driven around the concave to the point D, where it is liberated and is thrown by centrifugal action up the chimney, at right angles to the face of the beaters, and when its momentum is overcome by its gravity or by its impinging against the inclined or curved face of the chimney it falls on the back of the chimney into into the vacant area J I G, the bottom of which area conducts it again through the small open space into the concave, where it is driven around, again and passes up the chimney, falls back again through the area at the back of the chimney, and thus continues until it reaches the discharging end. At each revolution of the beaters the smut is broken, wheat scoured and driven, at the exact instant it is disengaged, up and out of the chimney. The wheat, as before described, falls back into the concave, but the smut, dust, white-caps, &c., being lighter than the wheat, are carried by the strong blast out of the top of the chimney. The same action of beaters which scours the grain will generate a blast sufficient for carrying up and through the chimney all the impurities separated from the wheat. The air for said blast enters at the open ends of the concave, and the vent being through the chimney causes the machine to generate a powerful blast, while at the same time it acts as a thorough scourer of the wheat, without requiring an increase of power over that required for either of the operations separately.

The manner of conducting the wheat from the receiving end of the machine to its discharging point is seen in Fig. 3. In the area J I G is hung a series of aprons, U, (made of iron or other sheet metal.) They are each arranged on a wire or rod, which rests on the top of the partition at G, the opposite end passing through the back of the chimney at J. The apron fills the area J I G, and being hung at the points G J, are adjustable to any desired inclination, as seen in Fig. 4.

In Fig. 4, O represents the hopper at which the wheat enters into the cylinder, and following the arrows from the point A the wheat is forced around the concave and up the chimney, and falls into the area upon the first apron U. Now, as before mentioned, this apron is so inclined that when the wheat has reached the bottom of the apron (at which point it again enters the cylinder) it has advanced several inches, (more or less,) according to the inclination given to the apron. Thus it passes from one apron to the next until it falls on the last one, which, instead of conducting into the cylinder, conveys it into a spout, L T, fitted to the bottom of the last apron U, through which spout it is carried out of the machine and to any desired place.

Smut-mills as heretofore known and constructed are imperfect, not so much, however, in scouring off the impurities as in discharging them at the moment they are disengaged, particularly the smut, for if this is allowed to fall back upon the grain after the ball is once broken it adheres to the grains with such tenacity as to defy any mechanical means heretofore known to disengage it therefrom. By the method which I have adopted, instead of allowing the wheat and impurities to come together after they are once separated, or, rather, detached, I cause the whole to be thrown out of the concave, so that the impurities, which are the lighter, may be carried out by the blast or current through the machine, while the grain is returned freed from them for another scouring operation in the concave, and is again and again thrown out at each and every revolution of the beaters, to allow the blast to carry off the impurities as fast as they are detached from the grains; and it may be said of the operation of this machine that it scours the wheat in the concave by a series of repeated operations, while the whole contents of the concave is thrown out of the machine at each and every repeated scouring operation, that the impurities may be separated and carried off as fast as they are loosened, and not allowed to return again into the concave.

The striking difference, therefore, between my machine and others heretofore essayed consists in the thorough and instant discharge of all impurities the moment they are disengaged, particularly the smut, the large opening in the top of the concave affording an unobstructed and ample vent to a strong blast that carries out all impurities, the blast created by the same power and means that scour the wheat, making the machine within itself not only a perfect wheat-scourer, but at the same time a most effective and extensive fan.

There is a principle involved in the operation of my machine which to the best of my knowledge has never before been known or practiced—viz., that of scouring within a cylinder or concave, and throwing the whole mass out of the machine, as it were, where the actual separation takes place, the impurities passing out and the grain returning back again for a similar operation. Many modifications of this principle may be made—such as changing the place for feeding in or for passing out the grain, altering the size or location of the opening between the concave and chimney, giving to the chimney a greater or less degree of inclination or curvature to guide and direct the grain in its ascent or descent therein, substituting other contrivance for the aprons for conveying the grain through the concave during the process; but all these I claim so long as I do not depart from the general character or organization of my machine.

Having thus fully described the nature of my invention, what I claim therein as new, and desire to secure by Letters Patent, is—

1. The manner herein described of scouring and freeing wheat of smut and other impurities by throwing the mass out of the concave at each revolution of the beaters, and against the inclined or curved face of a chimney fitted to an opening at or near the top of the concave, for the purpose of permitting the dust, smut, &c., to pass out, while the wheat is returned back into the machine for a second operation, substantially as described.

2. In combination with the concave, the adjustable inclined aprons for conveying the grain through the concave as it is successively returned back into the machine, substantially as described.

JEHU HOLLINGSWORTH.

Witnesses:
WILLIAM BEAUMONT,
WILLIAM WILSON.